Sept. 23, 1924.                J. G. GIULIANI                1,509,235
                       THEFT DETECTOR FOR AUTOMOBILES
                            Filed May 2, 1923            2 Sheets—Sheet 1
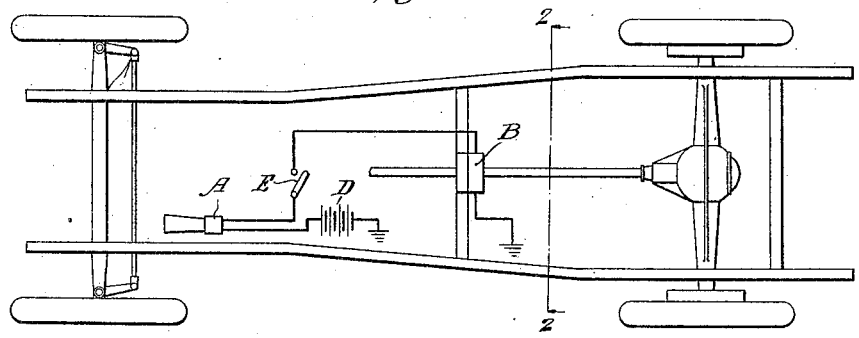
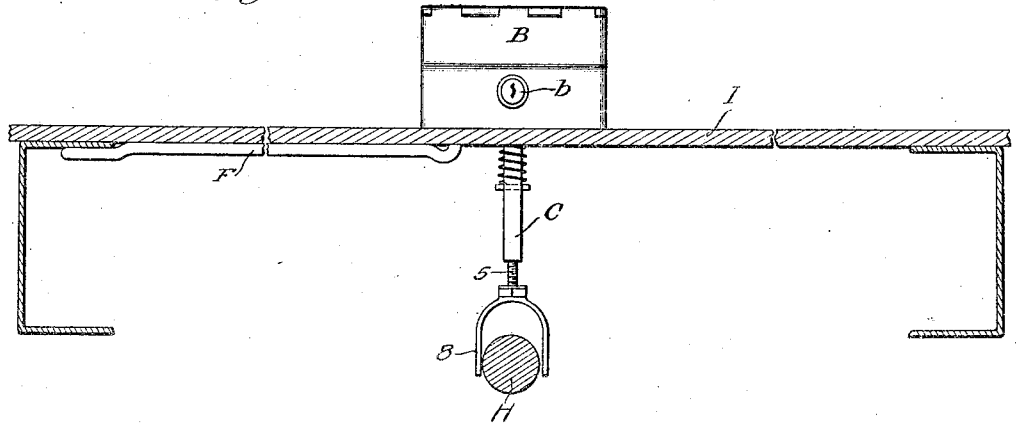
Inventor
Joseph G. Giuliani
By ………… Attorney

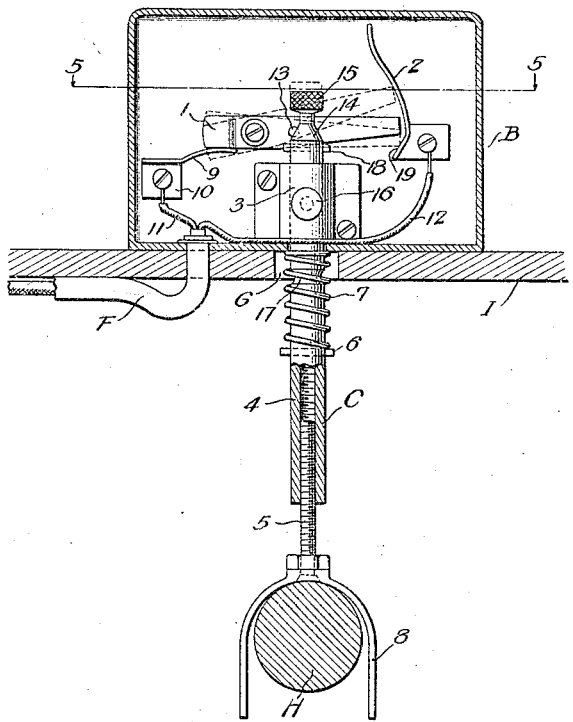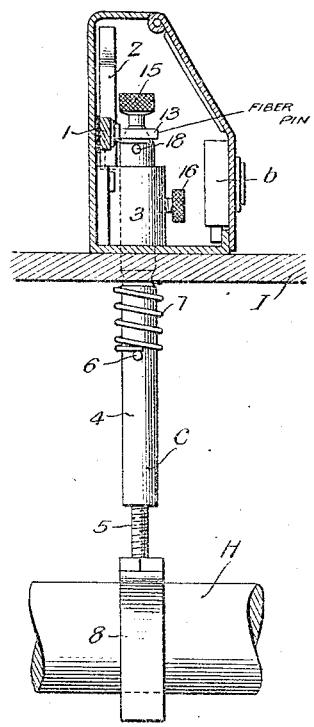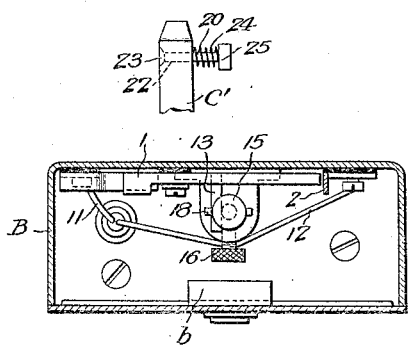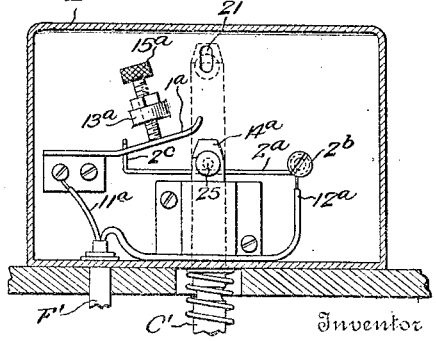

Patented Sept. 23, 1924.

1,509,235

UNITED STATES PATENT OFFICE.

JOSEPH G. GIULIANI, OF WASHINGTON, DISTRICT OF COLUMBIA.

THEFT DETECTOR FOR AUTOMOBILES.

Application filed May 2, 1923. Serial No. 636,253.

*To all whom it may concern:*

Be it known that I, JOSEPH G. GIULIANI, a citizen of the United States, residing at Washington, in the District of Columbia, have invented a new and useful Theft Detector for Automobiles, of which the following is a specification.

The present invention is a theft detector for automobiles.

Applicant is aware that previous efforts have been made to provide means for setting an alarm when unauthorized persons attempt to move automobiles or when they board the same, but these various devices are faulty, particularly in the fact that when the vehicle sets on an inclination, such as on a hill or with one side in a gutter or the like, the device is brought into operation.

The main object of the present invention is the provision of an extremely simple and economical theft protector consisting of few parts and which is put in operation as soon as any additional weight is placed upon the car, after the device has been set for a predetermined weight, the device not being affected by any variation in the inclination which the vehicle might ordinarily assume.

One of the principal features of the invention is that it is adjustable to all makes of cars and is applied thereto in a manner which will conceal all operating parts, said parts being enclosed, preferably in a hardened, steel casing. Furthermore, the invention is such that should an attempt be made to break or tamper with the parts, the device will be put into operation.

The invention further resides in the sundry details of construction, combination and arrangement of parts herein shown and described.

In this specification and the annexed drawings, the invention is disclosed in the forms in which it is considered to be the best, but the invention is not limited to such forms, because it is capable of being embodied in other forms; and it is to be understood that in and by the claims following the description herein, it is intended to cover the invention in whatever form it may embody within the scope thereof.

In the drawings, which show the preferred embodiment of the invention as at present devised:

Figure 1 is a diagrammatic view of an automobile chassis equipped with the invention.

Fig. 2 is a transverse sectional view taken substantially on line 2—2 of Fig. 1, and looking in the direction of the arrows.

Fig. 3 is an enlarged sectional view taken through the housing containing the operating parts of the detector, portions being shown in section to illustrate detailed construction.

Fig. 4 is a vertical sectional view of the device shown in Fig. 3, with parts shown in section to illustrate detail construction.

Fig. 5 is a transverse sectional view through the contact housing taken substantially on line 5—5 of Fig. 3.

Fig. 6 is a view similar to Fig. 3, but showing a modified form of the invention, and Fig. 7 is a fragmentary detail view of the actuating rod, illustrating means for maintaining same in operative position.

Like characters denote similar and like parts throughout the specification and drawings.

Referring particularly to Figs. 1 and 2 of the drawings, it will be observed that the principal elements of the present invention are a horn or other suitable alarm A, the circuit control means contained in the housing B and the actuating member C. The present invention employs electric circuits to actuate the alarm A, which circuits are fed from the usual battery D of the automobile and manually controlled by a switch E.

The alarm A may be the usual horn or signal used on the automobile, or may be an additional horn, bell or other signal carefully concealed in an inaccessible place on the car, such as for instance in the cushions of the seat, in the seat boxes, or elsewhere. When the usual horn is employed as the signal or alarm, it is preferred to encase the circuit wires between it and the mechanism in the box B, in suitable casing, such as case-hardened steel conduits F (see Figs. 2, 3 and 6), and to suitably encase their terminal connections with the horn or signal, so that they can not be readily accessible and disconnected.

The housing B is also of suitable metal, preferably case-hardened steel, and can be disposed anywhere on the automobile which overlies the drive shaft or other suitable part of the running gear. However, in practice it has been found that better results have been obtained by arranging the housing over the drive shaft. The box B may be built in either the front or the back seat, so as to be accessible from the exterior of the latter by inserting a key in the lock $b$ thereof, or the box may be disposed under the seat and only accessible when the cushion is removed. The switch E may be concealed in any convenient place such as in pockets in the doors, under the cowl, or the like. As before stated, all wirings are to be encased so that they cannot be cut. In cases where great precaution is desired the battery D may be an auxiliary battery separate and distinct from the one usually on the automobile and suitably concealed from sight and access.

Circuit controlling means contained in the housing B will now be described, and referring particularly to Figs. 3, 4 and 5 of the drawings, 1 denotes a switch arm pivotally mounted adjacent one of its ends within the housing, preferably to one wall thereof and suitably insulated therefrom. The switch arm 1 normally assumes a horizontal position indicated in the drawings. Mounted to one wall of the casing and insulated therefrom is a spring contact member 2 positioned adjacent the distal end of the switch arm and preferably of spring metal and having a somewhat curved or concave surface with which the end of the switch arm contacts. The actuator C consists of a rod-like member extending through an opening in the bottom of the housing B and is to extend through a suitable opening G provided in the flooring of the automobile in order that the actuator C may extend downwardly and contact with the drive shaft H or other suitable part of the automobile between which and the body or frame there is relative movement when additional weight is placed thereon. The actuator C is maintained in position by a suitable clip or other suitable supporting means 3 secured to the rear wall of the housing, or otherwise mounted therein, and has a slidable fit therein so that it may have a vertical movement when the relative distance between the flooring I of the automobile and the shaft H is increased or decreased.

In order that the invention may be adapted to automobiles of different makes the member C is composed of two telescoping or otherwise adjustable members 4 and 5 and in the present instance these members are shown as having a threaded adjustable connection. The member 4 is provided with a transverse pin 6, or with other suitable abutment, between which and the bottom of the housing B is interposed a yieldable spring 7 for the purpose of maintaining the actuator C in contact with the shaft H of the automobile.

It is preferred to have a saddle 8 secured to the lower end of the member C which will fit over the drive shaft so as to maintain the parts in their proper position and alignment, however, in some instances this saddle may not be necessary.

The end of the switch arm 1 adjacent its pivot is engaged by a spring wiper arm 9 extending from a bracket 10 to which is secured one of the circuit conductors 11. The other circuit conductor 12 is electrically connected to the spring contact 2 as shown particularly in Figs. 3 and 5. The spring wiper arm 9 is in constant electrical contact with the switch arm 1 and serves the further purpose of a leaf spring urging the switch arm to move downwardly. This downward movement is limited by a stop pin 13 extending laterally from the switch arm and in the path of the upper end of the actuator rod C; and by this arrangement the switch arm is held normally in its general horizontal position.

The upper end of the actuator C is reduced in diameter, one surface being of frustro-conical formation forming a cam surface 14, while the extremity of the rod beyond the cam 14 is enlarged and knurled to form a finger piece 15 for adjusting the control mechanism.

Assuming that the parts as shown in Fig. 3 are adjusted to actuate when an additional weight of three-hundred pounds is placed upon the body of the vehicle and the manual switch E is closed, as soon as this additional weight is placed upon any portion of the vehicle either in the back seat, front seat, running boards, fenders or the like, the body of the vehicle, including the flooring I thereof, will be depressed to a certain extent relative to the shaft H. This depression will cause the cam 14 of the actuator C to rise in the housing B and through the pin 13 move the lever arm 1 into dotted line position in Fig. 3, to contact with the member 2 and thereby close the circuit to the alarm A. This circuit will remain closed as long as this additional weight is on the vehicle. When it is removed from the vehicle, the circuit will be broken because the body of the vehicle will assume its normal relative position with respect to the shaft H, and the spring 7 will remove the actuator downwardly relative to the casing B, and the spring 9 will cause the switch arm to move downwardly, with the actuator, and out of contact with the member 2.

In some cases it is desirable to adjust the device so that it will function when a lesser weight is placed upon the vehicle and in this case the knurled finger-piece 15 can be turned to lengthen the actuator C. This in turn will cause the switch arm 1 to be moved upwardly closer to the curved end of the contact member 2 so that the device will be sensitive when lesser weights are placed on the vehicle. This invention proposes to have the knurled finger-piece 15 provided with a suitable scale to indicate the various adjustments which may be desired.

In some instances it is desired to move the lower end of the actuator out of contact with the drive shaft or other part of the running gear during normal running positions of the vehicle. To this end the actuator C can be raised to the dotted line position, shown in Fig. 3, by merely grasping the finger-piece 15 and raising the rod against the tension of the spring 7. The actuator may be held in raised position by any suitable means such as the set screw 16 which will engage in any suitable notch such as 17, provided on the member 4 of the actuator.

Should an unauthorized person attempt to tamper with the device or break and remove the actuator C, a pin 18 is provided at the upper end of the member 4 to prevent this member to be withdrawn from the housing B. To further insure against tampering the lower end 19 of the spring 2 is offset inwardly into the path of the distal end of the switch arm 1 so that the latter will contact therewith, when moved downwardly out of its normal neutral ineffective position by the spring 9. Thus it will be seen that the device is fool-proof and should unauthorized persons tamper with the same the alarm will be sounded and will continue until the authorized person opens the switch E.

In Fig. 6 a modified form of the theft detector of the present invention is shown. It comprises the housing B' and the actuator C' as shown above. In this form of the invention the switch arm 1 has been modified and consists of a spring arm contact member 1ª which has one end secured to the housing B and insulated therefrom as shown at $x$, and electrically connected with one of the circuit wires 11ª. The tendency of the spring arm A is to move upwardly but the same may be adjusted relative to the upper end 14ª of the actuator C by the adjusting screw 15ª threadedly mounted in a suitable lug 13ª and insulated from the housing B'. A spring finger 2ª is connected to and insulated from the housing B' as shown at 2ᵇ, and has connection at this point with the other circuit conductor 12ª. The finger 2ᵇ extends horizontally across the casing and has a medial portion thereof normally contacting with the actuator C', the free end of this finger being formed with an upstanding lateral projection 2ᶜ normally out of contact with the spring arm 1ª.

From this construction it will be seen that the spring arm 1ª can be adjusted by the set screw 15ª at any distance from the end 14ª of the actuator C' to close the circuit according to any unpredetermined weight placed upon the body of the vehicle. Should an unauthorized person attempt to tamper with the actuator C', as set forth in connection with the above embodiment, such as by forcing the actuator out of the housing, the spring finger 2ª will ride over the reduced surface 14ª on the end of the actuator C' and move its lateral projection 2ᶜ into contact with the finger 1ª, thereby completing a circuit which can only be closed when the housing B', or the switch E is opened. In this form of the invention, when it is desired to raise the actuator out of contact with the shaft H, it may be maintained in its raised position by a suitable catch consisting of a pin 20 slidably extending transversely through an aperture in the upper end of the actuator C' and having an enlarged end which will be received in the opening 21 in the housing. The aperture 22 in the actuator C' is countersunk, as indicated in Fig. 7, to receive the enlarged head 23. The catch 20 is held in its normal position shown in Fig. 7 by a yieldable spring 24 interposed between the finger-piece 25 and the actuator.

From the above it will be seen that a fool-proof theft detector and alarm is provided which will be placed in operation as soon as additional weight is placed anywhere on the body of the vehicle. One of the advantages of this invention is that the operating mechanism will not be affected by any usual position which the vehicle may assume such as when standing on a hill, or with two of its side wheels in a gutter or ditch, the device only being brought to operation when additional weight is placed upon the body of the vehicle at any point thereon. Under ordinary running conditions the switch E is opened so that the vibrations of the vehicle will not cause the device to be effective, and it is desirable also when the drive shaft is not inclosed in a casing to raise the actuator out of contact therewith so that the lower end thereof will not become worn.

Having thus described my invention, what I claim and desire to secure by United States Letters Patent is:

1. An automobile theft alarm comprising alarm means mounted on the body of the vehicle, actuating means extending between said alarm means and a portion of the vehicle substantially at the longitudinal center thereof and with respect to which the body is moved, when additional weight is applied thereto, for setting said alarm means into operation on such movement.

2. An automobile theft alarm comprising alarm means mounted on the body of the vehicle, and actuating means between said alarm means and the drive shaft means of the automobile for setting the alarm means into operation on movement of the body relative to the drive shaft means caused by the addition of weight to said body.

3. An automobile theft alarm comprising alarm means mounted on the body of the vehicle, a slidably mounted actuator extending between said alarm means and a portion of the vehicle with respect to which the body is movable, one end of the actuator being engageable with the alarm means and the other end with said portion of the vehicle for setting said alarm means into operation upon relative movement between said alarm means and actuator.

4. A device as set forth in claim 2 further characterized by said actuating means being adjustable in length adapting it to various makes of cars.

5. An automobile theft detector comprising an alarm, a circuit therefor, a circuit closer for said circuit to be mounted on the body of the vehicle substantially along the longitudinal center thereof, an actuating rod interposed between said circuit closer and the drive shaft of the vehicle, to engage the latter and to actuate the circuit closer upon relative movement between the body of the vehicle and said drive shaft, and means for adjusting said circuit closer to be effective upon different degrees of movement between said body and running gear.

6. An automobile theft detector comprising an alarm and circuit therefor, a circuit closer for said circuit to be mounted upon the body of the vehicle substantially along the longitudinal center thereof, an actuating rod extending downwardly from said circuit closer to engage with part of the drive shaft of the vehicle and to close said circuit upon relative movement between the body and said running gear, said circuit closer including a spring arm arranged in the path of movement of said actuating rod, and said actuating rod having a wiping contact with said arms.

7. A device as set forth in claim 6 further characterized by means for adjusting said spring arm relative to said actuating rod, whereby the circuit closer is actuated upon different degrees of movement between the body of the vehicle and the running gear thereof.

8. A device as set forth in claim 6 further characterized by a spring finger in said circuit and normally held out of contact with said circuit closer by said actuating rod.

9. A device as set forth in claim 6 further characterized by means for maintaining and normally urging said actuating rod in contact with the running gear of the vehicle, and other means for retaining said actuating rod out of contact with the drive shaft of the vehicle and in ineffective position.

10. In an automobile theft detector, an alarm and a circuit therefor, a circuit closer in said circuit and adapted to be mounted on the body of the vehicle, an actuating rod mounted with respect to said circuit closer to actuate the same, and extending therefrom to engage a part of the vehicle, an auxiliary circuit closer in said circuit and arranged to be normally held open by said actuating rod, whereby said auxiliary circuit closer will close said circuit should said rod be moved out of proper position.

11. An automobile theft alarm comprising a housing mounted on the vehicle body, an alarm operating mechanism in said housing, an actuating rod extending from said mechanism through said housing, a yoke on the extended end of said rod to engage about a portion of the vehicle having relative movement with the body when additional weight is placed upon the latter, whereby the alarm is set into operation by the relative movement between the body and said portion of the vehicle.

12. An automobile theft detecting device comprising an alarm and circuit therefor, a circuit closer in said circuit and mounted on the body of the vehicle, and a slidably mounted actuator extending between said circuit closer and a member of the vehicle with respect to which the body is movable, when additional weight is placed on the latter, one end of said actuator being adapted to engage said circuit closer and the other end to engage said member, whereby the circuit is closed when the body is moved relative to said member.

13. A device as set forth in claim 12 further characterized by said actuator consisting of an adjustable rod.

14. An automobile theft detecting device comprising an alarm means mounted on the body of the vehicle, an actuating means mounted on a portion of the vehicle at substantially the longitudinal center of the vehicle and between which portion and the body there is relative movement, when additional weight is applied to the body, whereby said alarm means and actuating means have a relative movement with respect to each other for setting alarm means into operation.

15. A device as set forth in claim 12 further characterized by means for releasably maintaining said actuator out of contact with said member of the vehicle and in ineffective position.

In testimony whereof I have hereunto set my hand.

JOSEPH G. GIULIANI.